(12) United States Patent
Chiu

(10) Patent No.: US 6,344,916 B1
(45) Date of Patent: Feb. 5, 2002

(54) METHOD AND DEVICE FOR MEASURING DEPTH OF FIELD

(75) Inventor: Chui-Kuei Chiu, Hsinchu (TW)

(73) Assignee: Umax Data Systems Inc. (TW)

( * ) Notice: Subject to any disclaimer, the term of this patent is extended or adjusted under 35 U.S.C. 154(b) by 0 days.

(21) Appl. No.: 09/658,448

(22) Filed: Sep. 8, 2000

(30) Foreign Application Priority Data

Jun. 22, 2000 (TW) ........................................ 89112341 A

(51) Int. Cl.$^7$ ............................................. G02B 26/08
(52) U.S. Cl. ..................... 359/212; 359/900; 355/55; 355/77
(58) Field of Search ................... 359/196–215, 359/223, 900; 358/474, 482, 483, 494, 497, 504; 355/77, 55

(56) References Cited

U.S. PATENT DOCUMENTS 4,984,013 A * 1/1991 Terashita ..................... 355/77
6,222,934 B1 * 4/2001 Tsai ............................ 382/112

* cited by examiner

*Primary Examiner*—James Phan
(74) *Attorney, Agent, or Firm*—Troxell Law Group PLLC

(57) ABSTRACT

A method and device for measuring depth of field for scanner includes placing a slant test chart above the scanning board. Scanning the test chart to obtain image of different heights. Dividing the image to multiple zones. Mapping image histogram of each zone to get a maximum and minimum value for calculating Modulation Transfer Function (MFT). Thereby to derive a line graph for depth of field distribution range. Based on that to adjust the CCD and lens to get the optimum focus point.

14 Claims, 4 Drawing Sheets

$$MTF = \frac{(a-b)}{(a+b)} \times 100\%$$

METHOD AND DEVICE FOR MEASURING DEPTH OF FIELD

FIELD OF THE INVENTION

This invention relates to a method and device for measuring depth of field that uses a charged couple device (CCD) and a lens to scan a selected and slanted test chart to obtain focusing characteristics thereby to derive depth of field distribution range for getting optimum focus point of the CCD and lens.

BACKGROUND OF THE INVENTION

Scanner is a widely used computer peripheral device nowadays for input image data into the computer. The explosive growth and popularity of Internet in recent years has further expanded the usage of scanner. It becomes an essential device for producing image and text Web pages for Internet applications. Scanner function, quality and versatility become very important. Focus adjustment capability and resolution of the scanner are among the key features that have been highly valued and demanded by users.

During scanner production process, scanner focus adjustment is a critical operation which will greatly affect scanner quality. FIG. 1 shows a conventional technique of testing and tuning scanner focus. It uses a pair of holder 11 to support a test chart 10 above the transparent scanning object board 12. Below the scanning board 12, there is a scanning chassis 20 which includes at least one reflection mirror 21, a lens 22 and a CCD 23. During testing process. The scanning chassis 20 is moved to scan the test chart to get a test image. Then another height of holder 11 is used to support the test chart 10 for obtaining another testing image. After a selected number of testing have been performed with different holder heights, a distribution line graph of Modulation Transfer Function (MFT) may be derived for focus adjustment. As each holder height has a definite value, the corresponding MFT is a discrete number and not very accurate as a whole. Besides, many different heights of holder 11 have to be prepared and setup for testing to obtain the MFT. It is a very time consuming and not precise process. There is still room for improvement.

SUMMARY OF THE INVENTION

It is an object of this invention to provide a simple method and device for measuring and testing depth of field of scanner with greater accuracy. According to this invention, a test chart is placed on a slant board which has one side resting on the scanning board and another side supported by a holder of a selected height above the scanning board to form a plurality of scanning zones of different heights. Then the scanning chassis may be moved almost linearly to scan the test chart to obtain the mating MFT and derive a line graph of depth of field distribution, based on which to derive the optimum focus point.

The method and device according to this invention includes a selected test chart, a holder of a selected height, a transparent scanning board, a scanning chassis of fixed optical path which consists of a least one reflection mirror, a lens and a CCD. The test chart is a line pair test chart which has a plurality of diagonal black and white strips. The holder is mounted at one end of the scanning board. The test chart is then held at a slant manner above the scanning board with one end thereof resting on the holder and another end resting on the scanning board. The scanning chassis then may be moved to scan the test chart for obtaining corresponding MTF distribution for adjusting focus use.

During operation, the scanning chassis may be moved horizontally to scan the test chart. The test chart has a plurality of zones formed by multiple transverse and longitudinal lines. Each zone has diagonal black and white strip pairs. Based on the scanning results, an image histogram may be produced. Then MTF may be derived. The MTF calculation equation is:

$$MTF=(a-b)/(a+b)*100\%$$

Where:
- a: is maximum histogram value,
- b: is minimum histogram value,

A zone that produces greatest value difference between a and b will derive maximum MTF value, and indicates the best focus adjusting point.

Because of the slant test chart of this invention, a continuous linear MTF graph and distribution may be obtained for scanner design and production use to adjust the CCD and lens for the optimum focus.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENT

This invention aims at providing a method and device of measuring depth of field for scanner. It uses a line pair test chart of a half resolution containing black and white diagonal strips slantedly supported by a holder to a selected height on the scanning board in Y-axis or X-axis to be scanned for obtaining MTF. A chart of depth of field distribution and acceptable range may be mapped after multiple scanning results have been obtained, whereby to derive the optimal scanner focus. Because of this invention, continuous scanning process and MTF distribution chart may be obtained whereby to dynamically change design and production process to produce high quality scanners with accurate focus. The scanning chassis may be moved manually, by means of a firmware or software.

Figure 1:
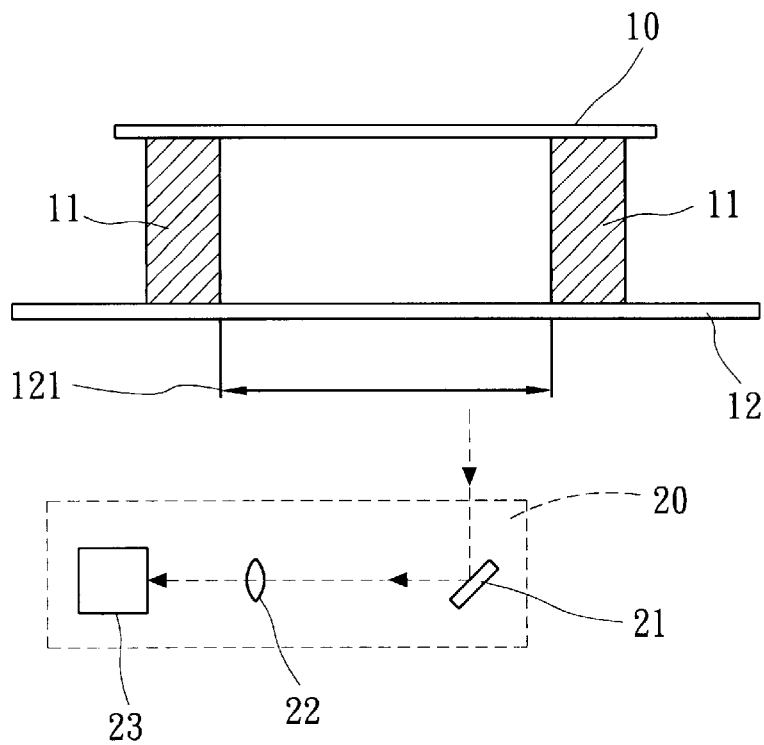
FIG. 1 is a schematic side view of a conventional technique for adjusting scanner focus by using two holders supporting a test chart.
Figure 2:
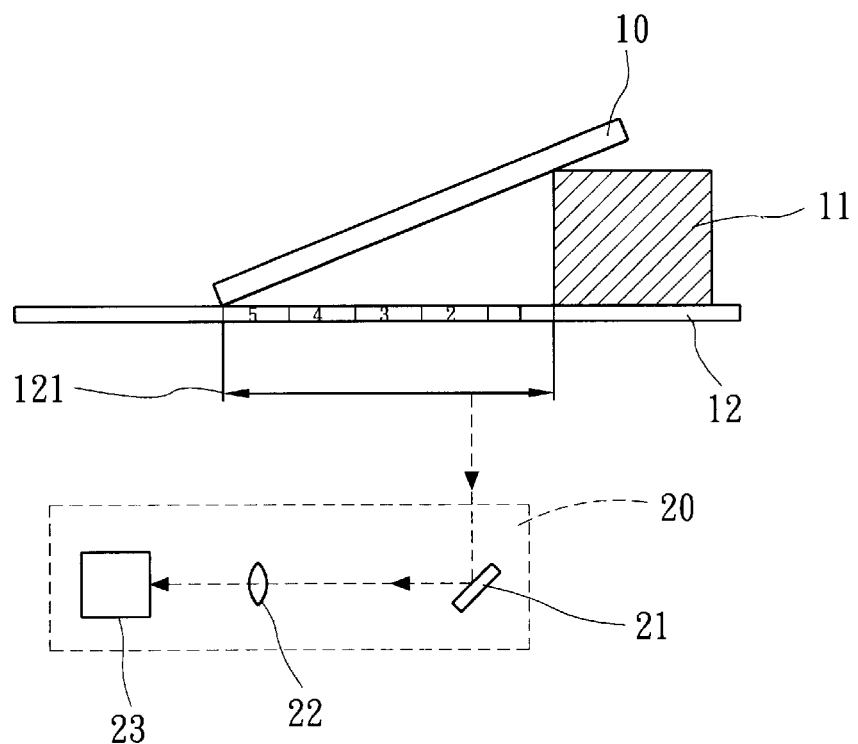
FIG. 2 is a schematic side view of an embodiment according to this invention.

FIG. 2 shows a device embodiment using the method of this invention. At one end of the scanning board 12, a holder 11 of selected height is placed. A selected test chart 10 has one end resting on the holder 11 and another end resting on the scanning board 12 to become a slant manner.

The scanning area 121 on the scanning board 12 is divided into multiple zones each has a mating zone on the test chart 10. Then the scanning chassis 20 which may include at least one reflection mirror 20, a lens 22 and a CCD may be moved linearly and continuously to scan the test chart by zone to obtain scanning images. The scanning board may be a physical transparent plate or a pseudo plane.

Figure 3:
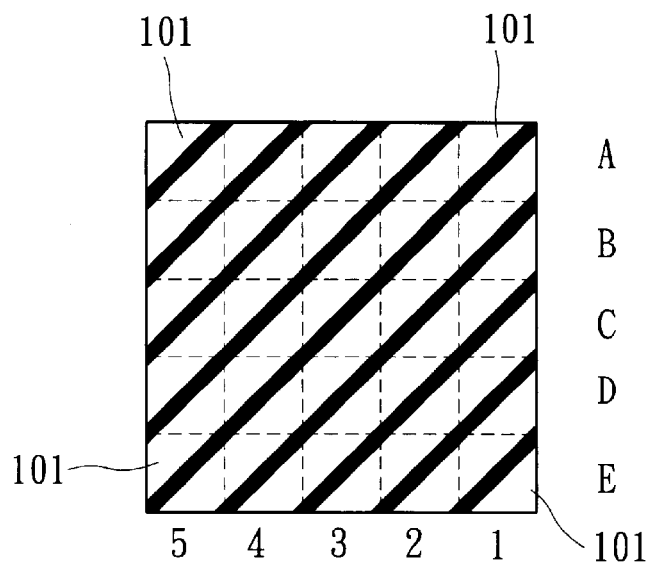
FIG. 3 is a schematic view of scanning image of a test zone.

FIG. 3 shows a schematic example of scanning image by zone. As the test chart 10 has a plurality of black and white diagonal strips and located above the scanning board 12 in a slant manner, the horizontally moving scanning chassis 20 may produce scanning image of the zones of various heights and result in corresponding MTF for mapping a linear and continuous graph. Instead of moving horizontally, the scanning chassis may also be moved vertically during scanning operation.

Figure 4:
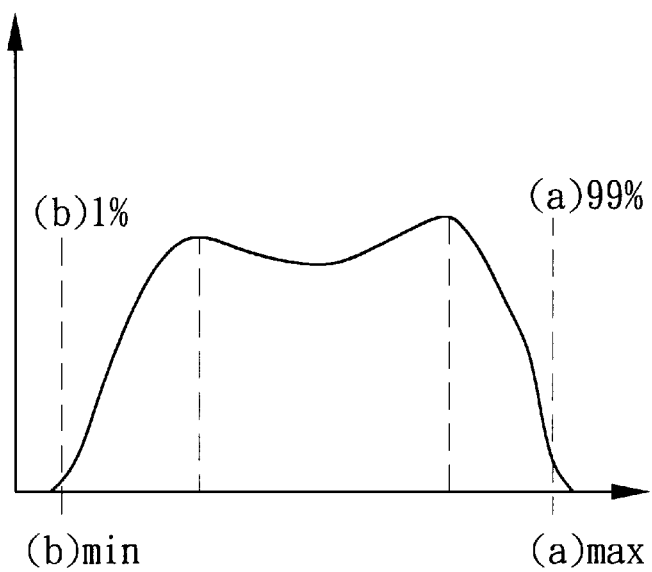
FIG. 4 is an image histogram based on FIG. 3.

FIG. 4 shows an image histogram of a selected zone based on FIG. 3 The curve has two humps. The leftmost starting point represents the minimum value b, and the rightmost ending point represents the maximum value a. Another method for getting the value of a and b is through the occupation area. For instance, taking the greater portion (say 99%) as a, and taking a smaller portion (say 1%) as b. The MTF calculation equation is:

$$MTF=(a-b)/(a+b)*100\%$$

Hence the greater value of (a-b), the greater MTF becomes. It represents a more desirable adjusting focus. When a is smaller, or b is larger, the MTF becomes smaller. It then represents a poorer adjusting focus.

Figure 5:
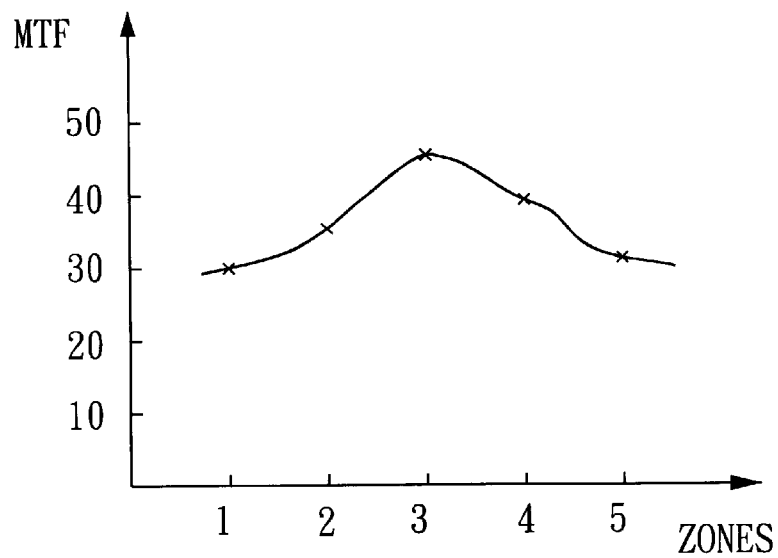
FIG. 5 is an example of MTF distribution after scanning a plurality of continuous zones.

FIG. 5 is a MTF distribution chart obtained from scanning a plurality of zones 101. When the scanning chassis 20 scans from zone A1 through A5 (in FIG. 3), image resolution will be different because of different zone heights. The MTF results will also be different. They are posted in the chart at five different coordination positions. They represent the range of depth of field and may be used reference in adjusting focus. By the same token, scanning may be done for the zones from B1 through B5, then from C1 through C5, until all zones are covered (see FIG.3). Then a plurality of MTF distribution graph may be derived for obtaining the optimum focus.

Figure 6:
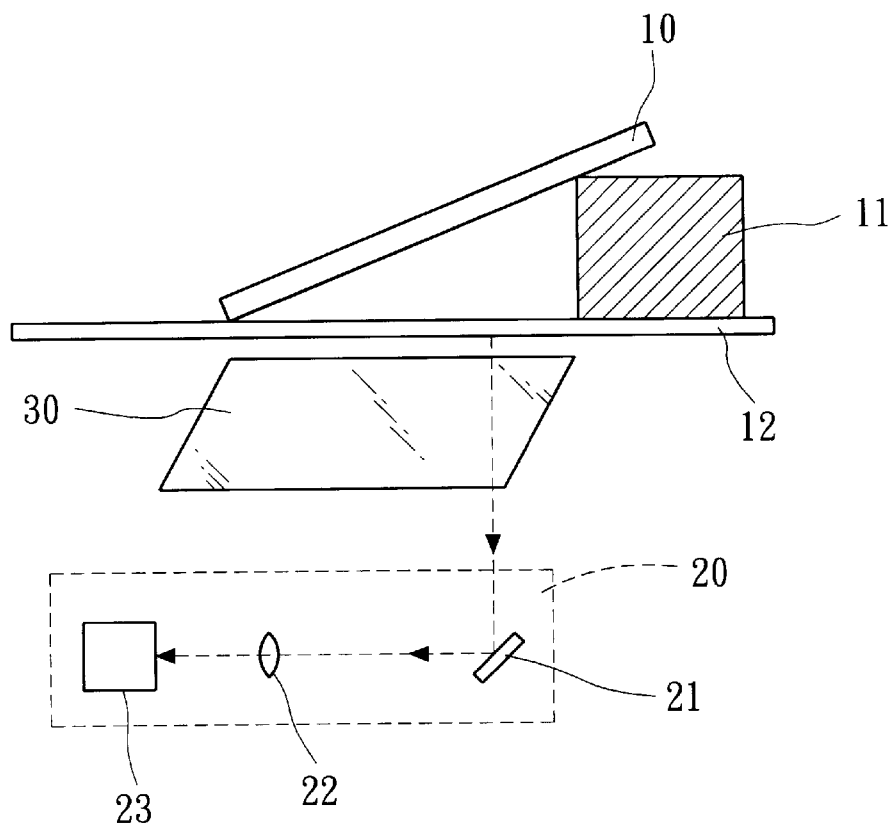
FIG. 6 is a schematic side view of another embodiment according to this invention including a dielectric medium located below the scanning board.

FIG. 6 shows another embodiment employing this invention. It is largely constructed like the one shown in FIG. 2. Because conventional scanner may get MTF distribution based on the scanning board or above, but cannot do that for the area below the scanning board, a piece of dielectric glass 30 may be placed below the scanning board for measuring MTF below the scanning board. According the optical Snell's law, different material has different refraction index. Hence by raising the focus point to a selected height, then adding a piece of dielectric of various thickness (such as a crown glass 30 shown in FIG. 6, with light transparency index n=1.52) in the optical path, then the MTF distribution below the scanning board may be obtained through the glass 30.

Figure 7:
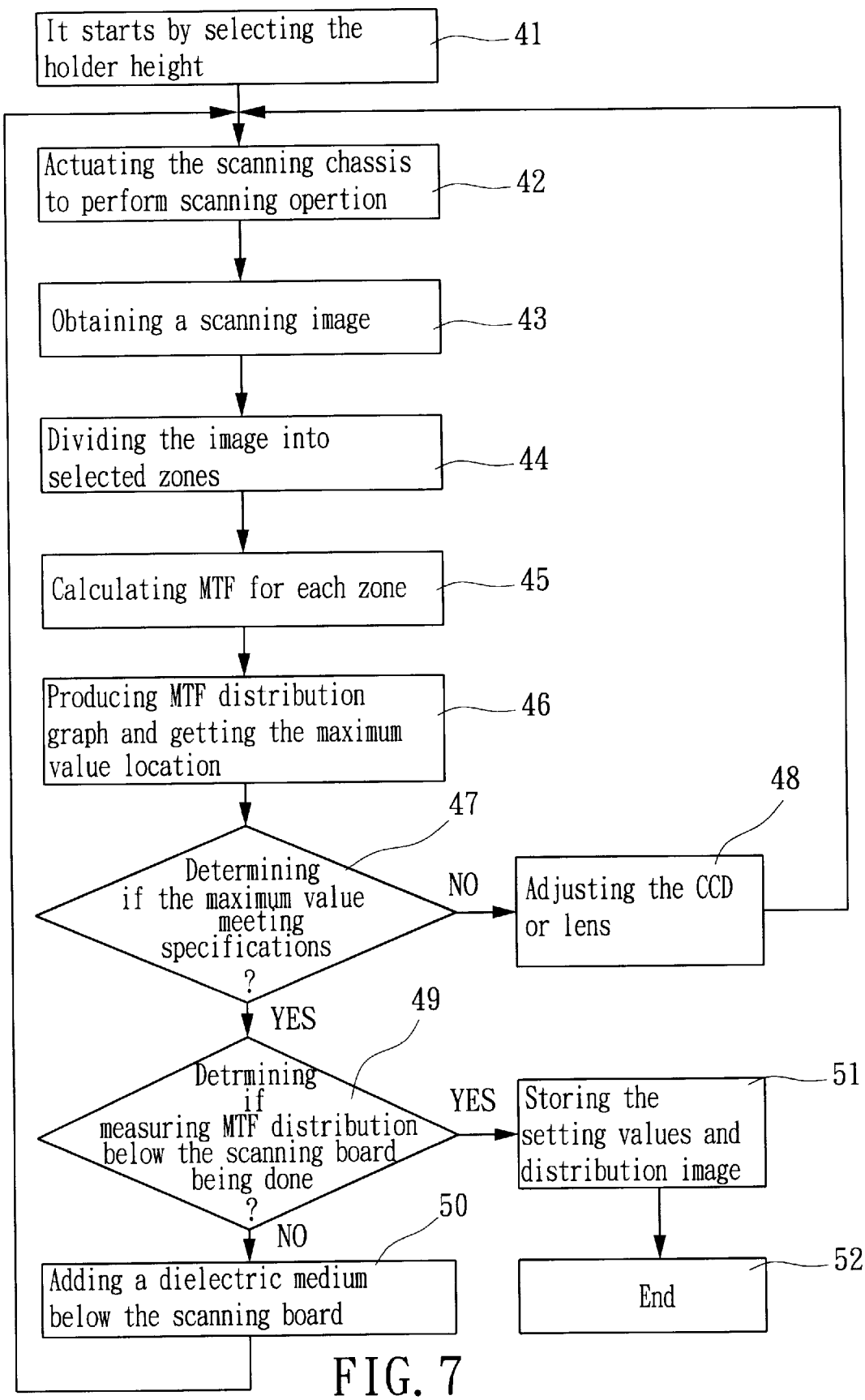
FIG. 7 is an operation flow chart of this invention.

FIG. 7 illustrates the measuring process according to this invention. It starts by selecting the holder height 41 for the slant test chart, then actuating the scanning chassis to perform scanning operation 42, obtaining a scanning image 43 (which has black and white diagonal strips), dividing the image into selected zones 44, calculating MTF for each zone 45 by using the equation of:

$$MTF=(a-b)/(a+b)*100\%,$$

producing MTF distribution graph and getting the maximum value location 46, determining if the maximum value meeting specifications 47, if the step 47 outcome is negative, adjusting the CCD or lens and going back to the step 42 to start another cycle of process 48, if the step 47 outcome is positive, determining if measuring MTF distribution below the scanning board being done 49, if the step 49 outcome is negative, adding a dielectric medium below the scanning board 50 and going back to the step 42, otherwise storing the setting values and distribution image 51 and ending the process 52.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A device for measuring depth of field, comprising
a scanning board having a first end and a second end,
a holder of a selected height having a top end and a bottom end resting on the scanning board at the first end,
a test chart having an image formed thereon and having a third end resting on the top end and a fourth end resting on the scanning board at the second end to form a slant manner above the scanning board, the image being divided in a plurality of zones based on different height and scanning area, and
a movable scanning chassis located below the scanning board for horizontally scanning the test chart image for computer calculating modulation transfer function based on each zone to derive distribution of modulation transfer function of continuous zones to obtain an optimum focus point for adjusting an image sensing means or a lens in scanner production process.

2. The device for measuring depth of field of claim 1, wherein the scanning chassis includes a plurality of reflection mirrors, a lens and an image sensing means.

3. The device for measuring depth of field of claim 1, wherein moving of the scanning chassis is controlled by a controlled means including manual, a firmware or a software.

4. The device for measuring depth of field of claim 1, wherein the scanning chassis is movable vertically up and down for scanning.

5. The device for measuring depth of field of claim 1, wherein the third end of the test chart is located at a longitudinal (Y) axis or at a transverse (X) axis.

6. The device for measuring depth of field of claim 1, wherein the image on the test chart contains line pairs of black and white diagonal strips of in a half resolution.

7. The device for measuring depth of field of claim 1, wherein the calculation of modulation transfer function (MTF) uses the image in a zone for mapping a histogram graph to get a maximum value a and a minimum value b, the modulation transfer function being calculated by an equation of:

$$MTF=(a-b)/(a+b)*100\%.$$

8. The device for measuring depth of field of claim 7, wherein the calculation of modulation transfer function (MTF) uses the image in a zone for mapping a histogram distribution graph to get a maximum value a which represents 99% of distribution and a minimum value b which represents 1% of distribution.

9. The device for measuring depth of field of claim 1, wherein the scanning board is a pseudo plane.

10. The device for measuring depth of field of claim 1 further having a dielectric medium of a selected refraction index located below the scanning board for measuring the modular transfer function below the scanning board.

11. The device for measuring depth of field of claim 10, wherein the dielectric medium is an optical crown glass of a selected thickness.

12. A method of measuring depth of field, comprising a process which includes the following steps:
   a. placing a test chart at a selected slanted angle and height above a scanning board,
   b. moving a scanning chassis to perform scanning operation,
   c. obtaining a scanning image,
   d. dividing the image to selected zones,
   e. calculating modulation transfer function of each zone,
   f. producing a modulation transfer function distribution graph to get a maximum point,
   g. checking if the maximum point meeting a required specification,
   h. adjusting position of an image sensing means or lens,
   i. determining if measuring modulation transfer function distribution below the scanning board being done,
   j. adding a dielectric medium in an optical path,
   k. storing setting values and the distribution graph, and
   l. ending the process.

13. The method of measuring depth of field of claim 12, wherein the step i is executed when the step g outcome is positive, and the step h is executed and the process branches to the step b for another cycle of process when the step g outcome is negative.

14. The method of measuring depth of field of claim 12, wherein the step k is executed when the step i outcome is positive, and the step j is execute when the step i outcome is negative.

* * * * *